(12) United States Patent
Schnurr et al.

(10) Patent No.: US 10,956,633 B1
(45) Date of Patent: Mar. 23, 2021

(54) INTEREST-BASED DISTRIBUTED SIMULATION SYSTEM

(71) Applicant: The Electric Infrastructure Security (EIS) Council, Inc., Washington, DC (US)

(72) Inventors: Joseph Forrest Schnurr, Modiin (IL); Alvin Douglas Schnurr, Jerusalem (IL)

(73) Assignee: THE ELECTRIC INFRASTRUCTURE SECURITY (EIS) COUNCIL, INC., Washington, DC (US)

( * ) Notice: Subject to any disclaimer, the term of this patent is extended or adjusted under 35 U.S.C. 154(b) by 0 days.

(21) Appl. No.: 17/094,388

(22) Filed: Nov. 10, 2020

Related U.S. Application Data

(60) Provisional application No. 62/945,650, filed on Dec. 9, 2019.

(51) Int. Cl.
| | |
|---|---|
| *G06F 30/20* | (2020.01) |
| *G06F 9/455* | (2018.01) |
| *G06F 16/23* | (2019.01) |
| *G06F 8/65* | (2018.01) |
| *G06F 111/02* | (2020.01) |

(52) U.S. Cl.
CPC .............. *G06F 30/20* (2020.01); *G06F 8/65* (2013.01); *G06F 9/455* (2013.01); *G06F 16/2379* (2019.01); *G06F 2111/02* (2020.01)

(58) Field of Classification Search
CPC ........ G06F 30/20; G06F 16/2379; G06F 8/65; G06F 9/455; G06F 2111/02

USPC ............................................................ 703/2
See application file for complete search history.

(56) References Cited

U.S. PATENT DOCUMENTS

| | | | |
|---|---|---|---|
| 2019/0095560 A1* | 3/2019 | Lewis | G06F 9/4856 |
| 2019/0182195 A1* | 6/2019 | Avital | H04L 67/22 |

OTHER PUBLICATIONS

Lee_2000 (Adaptive dead reckoning algorithm for Distributed Interactive Simulation, Jan. 2000 I. J. of Simulation vol. 1 No. 1-2 ISS 1473-804X online, 1473-8031) (Year: 2000).*

* cited by examiner

*Primary Examiner* — Brian S Cook
(74) *Attorney, Agent, or Firm* — Tutunjian & Bitetto, P.C.

(57) ABSTRACT

A system, method and product for an interest-based distributed simulation system. A system comprising: multiple servers, wherein a component-server deployment defines which server is tasked with processing each component of a simulation; a central database for storing values of components and delivering the values or portion thereof to servers based on interest definitions. A server of the multiple servers is authoritative over a target component of the plurality of components of the simulation. The server is configured to determine an inverse interest list for the target component, wherein the inverse interest list identifies all components interested in the target component according to the interest definitions. The server selectively transmits updates of the target component to the central database based on the inverse interest list and based on the component-server deployment.

18 Claims, 10 Drawing Sheets

INTEREST-BASED DISTRIBUTED SIMULATION SYSTEM

CROSS-REFERENCE TO RELATED APPLICATION

This application claims the benefit of provisional patent application No. 62/945,650 filed Dec. 9, 2019, titled "EXERCISE, PREDICTION, AND RESPONSE MULTI-FIELD SIMULATOR", which is hereby incorporated by reference in its entirety without giving rise to disavowment.

TECHNICAL FIELD

The present disclosure relates to simulation systems in general, and to systems, products, and methods for providing simulation using a distributed system, in particular.

BACKGROUND

As organizations approach the problem of simulating complex systems, they increasingly find that their requirements exceed the processing capacity of a single computer server. In some cases, such as simulation of a multi-player game, the nature of the simulation demands interfacing multiple computers regardless of the complexity of the simulated world. Organizations have increasingly turned toward distributed simulation to meet these needs.

A single-instance simulation system may be unable to scale to support very large numbers of objects to simulate those objects in real-time. Such systems have typically relied on a single instance of a simulation engine, running on a single physical or virtual computer system, to simulate the entire simulated world. Such systems are generally unable to scale well and provide correctness, graphical fidelity, and real-time-interaction. The magnitude and complexity of the situation is further increased in the case of a simulation of complex real-world problems. These may require more computing power than a single simulation engine can provide. For example, a simulation of a city may require simulation of a large number of vehicles, pedestrians, bicyclists, traffic patterns, traffic lights, subway systems, transit vehicles, airplanes, and a multitude of other entities that affect and contribute to city life.

Distributed simulation techniques allow multiple servers, sometimes referred to as "workers", to work together to simulate the processes of a single virtual world. A range of approaches have been developed toward this problem, a significant portion of which define the world as a collection of entities and corresponding data components whose processing is assigned to some number of participating servers. As each server updates its assigned components' data, those updated values are transferred to other participating servers who need those updates for their own processing. In some distributed processing systems, these updates are sent directly, whereas in others they are sent through some type of middleman system which frequently takes the form of a database, essentially storing the state of the simulated world and providing that information to the servers that need it.

This middleman database mechanism, referred to as central database, offers a number of advantages. The central database can make use of existing scalable database technologies, delegating transfer and storage of entity data to systems that are specifically designed for it and offloading these tasks from servers that are designed for operational simulation. By centralizing storage of an up-to-date record of the world state in a single repository, the central database may simplify development and debugging procedures. Whereas many distributed processing systems may support interactions between entities and components in close proximity, the central database paradigm may support long distance interdependencies between entities and components. For example, in gaming systems, where characters on high ground see far away, there may be a long-distance interdependency between virtual characters that are far apart. As another example, in network simulations, two networked nodes may be linked even if their simulated positions are not in close proximity. Providing a central database may allow for complex query definitions for each server so that the database can effectively deliver all the data that a server needs for its processing, and only such data.

These mechanisms allow many workers to work together to simulate a single interactive world. They are quite flexible and support numerous simulation scenarios and applications. However, the resources, e.g. computer servers, communication equipment and supported bandwidth, required to host these mechanisms are significant.

BRIEF SUMMARY

One exemplary embodiment of the disclosed subject matter is a distributed simulation system for performing a simulation comprising a plurality of components, the system comprising: multiple servers, wherein a component-server deployment defines which server is tasked with processing each component of the simulation; a central database for storing values of components and delivering the values or portion thereof to one or more servers based on interest definitions, wherein the interest definitions establish which values are needed by which components for processing by the server tasked in computing values thereof; wherein a server of the multiple servers is authoritative over a target component of the plurality of components of the simulation; wherein said server is configured to determine an inverse interest list for the target component, wherein the inverse interest list identifies all components interested in the target component according to the interest definitions; and wherein said server is configured to selectively transmit updates of the target component to the central database based on the inverse interest list and based on the component-server deployment, wherein said server is configured to selectively transmit the updates of the target component by avoiding transmitting updates of the target component in case there is no other server that is tasked with a component appearing in the inverse interest list.

Optionally, said server is configured to determine a send frequency for the target component according to update frequencies in the inverse interest list, whereby avoiding to provide immediate update for each modification of the target component.

Optionally, the server is configured to set a periodic update determination based on the send frequency, whereby the server is configured to periodically transmit to the central database an update of the target component that was not previously transmitted.

Optionally, said central database is configured to determine a send frequency for the target component according to update frequencies in the inverse interest list, wherein said central database is configured to transmit the send frequency to the server.

Optionally, the server is configured to set a periodic update determination based on the send frequency, whereby the server is configured to periodically transmit to the central database an update of the target component that was not previously transmitted.

Another exemplary embodiment of the disclosed subject matter is a distributed simulation system for performing a simulation comprising a plurality of components, the system comprising: multiple servers, wherein a component-server deployment defines which server is tasked with processing each component of the simulation; a central database for storing values of components and delivering the values or portion thereof to one or more servers based on interest definitions, wherein the interest definitions establish which values are needed by which server for processing values of respective tasked components; wherein a server of the multiple servers is authoritative over a target component of the plurality of components of the simulation; wherein said central database is configured to determine an inverse interest list for said server, wherein the inverse interest list identifies all servers requiring the target component to compute their components tasked thereto; and wherein said server is configured to selectively transmit updates of the target component to the central database based on the inverse interest list.

Optionally, the inverse interest list indicates send frequency, wherein said central database is configured to determine a send frequency requirement for the target component.

Optionally, said server is configured to uphold the send frequency requirement determined by said central database.

Yet another exemplary embodiment of the disclosed subject matter is a non-transitory computer readable medium retaining program instructions for implementing a method in a distributed simulation system for performing a simulation composed of a plurality of components, wherein the distributed simulation system comprising multiple servers and a central database, wherein each server of the multiple servers is tasked with processing a portion of the plurality of components of the simulation, wherein the central database is tasked with storing values of components and delivering the values or portion thereof to one or more servers based on interest definitions, wherein the program instructions are configured, when read, to cause a processor to perform: processing of a target component by the server, whereby setting a new value to the target component, wherein the target component is comprised by the plurality of components of the simulation, wherein the server is comprised by the multiple servers; and determining, based on interest definitions of other components that are processed by other servers, to avoid providing an immediate update of the new value to the central database, whereby reducing bandwidth utilization between the server and the central database, wherein said determining is based on an inverse interest list, wherein the inverse interest list comprises an identification of components whose values are calculated based on the target component, wherein said determining is further based on a determination whether a value of any of the components in the inverse interest list is computed by another server other than the server.

Optionally, said determining to avoid providing an immediate update comprises: determining, based on the interest definitions of the other components that are processed by other servers that computation of value of none of the other components is based on the target component; and determining to avoid providing any update to the central database.

Optionally, said determining to avoid providing an immediate update comprises: determining an update frequency requirement of the target component, wherein the update frequency is based on an update frequency request of each component that is processed by another server and that computation thereof is based on the target component; and providing an update to the target component after a time elapsed so as to uphold the update frequency requirement, whereby potentially reducing a number of updates of the target components that occur in a higher frequency than the update frequency requirement.

Optionally, said determining the update frequency requirement is performed by the central database, wherein the method further comprises sending the update frequency requirement from the central database to the server.

Optionally, the inverse interest list is pre-calculated, wherein said determination is based on a flag a-priori determined based on the inverse interest list.

Optionally, value of the flag is updated in response to a modification of component-server deployment causing a change in an identity of a server responsible for a component of the plurality of components.

Optionally, the inverse interest list is updated in response to a change in interest definitions.

Optionally, the program instructions are further configured to cause the processor to provide an immediate update of the new value of the target component to the central database in response to a change in the inverse interest list or in component-server deployment affecting the target component.

Optionally, the program instructions are configured, when read, to cause a processor to perform: determining, based on interest definitions of other components that are processed by other servers, to provide an immediate update of the new value to the central database; in response to said determining to provide the immediate update of the new value, transmitting from the server to the central database an update command, whereby setting the new value to the target component in the central database, whereby enabling the central database to update at least one other server that is different from the server with the new value of the target component.

Optionally, the program instructions are configured, when read, to cause a processor to perform: in response to a determination that the target component is a persistent component that is comprised by a snapshot of the simulation, providing an immediate update of the new value to the central database, whereby setting the new value to the target component in the central database.

Optionally, the program instructions are configured, when read, to cause a processor to perform: setting a periodic update of the target second component, wherein the target component is a persistent component that is comprised by a periodic snapshot of the simulation, wherein the periodic snapshot is taken at a predetermined interval, wherein the periodic update of the target component is determined based on the predetermined interval; and providing an update of the target new value to the central database in accordance with the periodic update.

Optionally, the interest definitions comprise expression-based interest.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
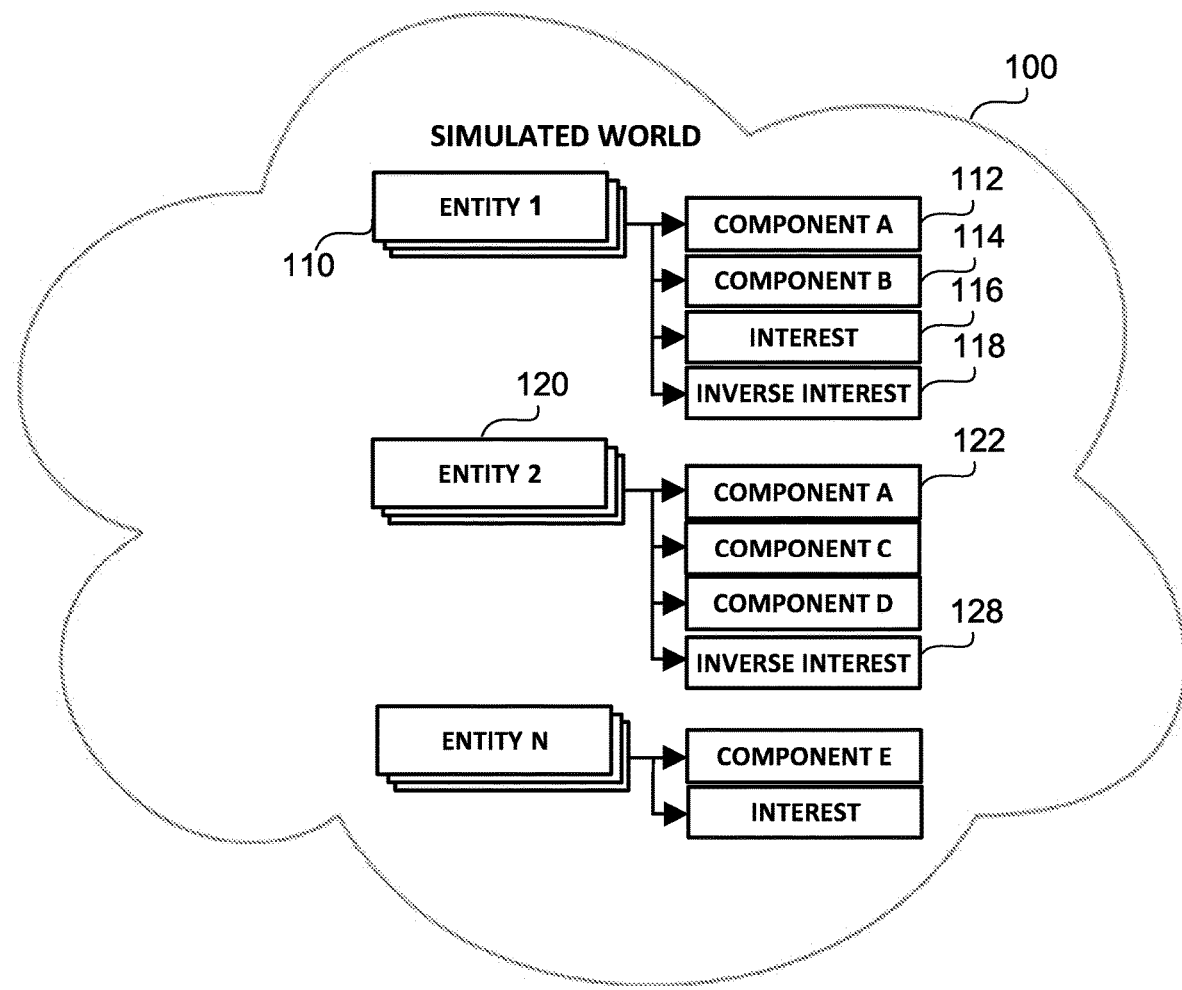
FIG. 1 shows an environment, in accordance with some exemplary embodiments of the disclosed subject matter.

One technical problem dealt with by the disclosed subject matter is to provide resource-efficient distributed simulation systems. Central database-based simulations allow many servers to work together to simulate a single interactive world. Such systems may be flexible and support numerous simulation scenarios and applications. However, they may be resource-intensive. Specifically, they may require a large number of servers to operate and utilize a relatively large communication bandwidth.

One example of a central database-based simulation is depicted in U.S. Patent Application Publication US 2019/0,095,560A1, published Mar. 28, 2019, entitled "Commands for Simulation Systems and Methods", which is hereby incorporated by reference in its entirety for all purposes, without giving rise to disavowment.

It may be desired to improve the efficiency of such systems, so as to decrease the ratio of required resources to simulation complexity. It may be desired to provide a system that can provide the simulation more efficiently. In particular, even when computer servers, communication equipment or supported bandwidth are limited, there is still a need to simulate detailed scenarios and systems. It may be desired to decrease the ratio of required resources to simulation complexity.

Some naïve implementations may retain a collection of entities and corresponding data components whose processing is assigned to some number of participating servers, sometimes referred to as "workers". As each server updates its assigned components' data, those updated values are transferred to other participating workers who need those updates for their own processing. These updates may be sent through a middleman system, referred to as "central database", who is tasked with storing the state of the simulated world and providing the information that each server needs from other servers for its own processing.

The central database mechanism offers a number of advantages. The central database can make use of existing scalable database technologies, delegating transfer and storage of entity data to systems that are specifically designed for it and offloading these tasks from servers that are designed for operational simulation. By centralizing storage of an up-to-date record of the world state in a single repository, the central database may significantly simplify development and debugging procedures. Additionally, or alternatively, the central database may enable the system to support complex types of queries, and support long distance interdependencies, which may be common in virtual worlds (e.g., in gaming systems where characters on high ground see far away; in network simulations where two networked nodes may be linked even if their simulated positions are not in close proximity). In some exemplary embodiments, providing the central database allows for complex query definitions for each server so that the database can effectively deliver all the data that a server needs and none of the data that it doesn't. These mechanisms may allow many servers to work together to simulate a single interactive world.

It may be desired to support a simulation in which servers may define a desired update frequency of a component. A server may define a minimum frequency of component updates that need to be streamed thereto, such as at least once every 10 seconds, once every minute, or the like. As one example, a location of entities may be important for entities who directly view them. However, the same information may be used for a mini-map module that has a much lower resolution and therefore can make do with less precise location data. Hence, servers handling the mini-map for an entity that does not have a view of the target entity, may define a lower update frequency of the location of the target entity than of servers handling entities having a view of the target entity. For example, a change in location of less than 50 m may not be visible in the mini-map, and assuming the maximal speed of the target entity is 5 m/s, the server may rely on an update frequency of 10 seconds or more, while servers handling the viewport of the user viewing the target entity, would require a higher frequency rate, such as of every 100 milliseconds.

It is noted that interest update frequencies might be defined in different ways for different Distributed Simulation Systems. While each might not send updates more than once per defined interval, one system might send the latest available update, another might aggregate all updates within the interval into a single message, and another might guarantee that it sends updates that are valid at some time during the latest interval, but not necessarily at the end of that interval. The disclosed subject matter may support different interest update frequency mechanisms in different ways.

The disclosed subject matter may need to support an option to save a snapshot of the simulated environment. In some exemplary embodiments, a world snapshot may be a dataset including data values for all entity components in the virtual world at a particular time. A snapshot may be used to initialize a distributed simulation system and may be recorded at a particular time during the course of a simulation. In some cases, the snapshot may be saved upon a user request, upon a server request, or the like. In some cases, periodic snapshots may be taken, such as for saving snapshots at a particular interval. In some exemplary embodiments, distributed simulation systems may offer some flexibility in defining what component types, components or component data are included in or excluded from a snapshot. A component that is included in the snapshot may be termed "persistent".

It may be desired that the disclosed subject matter support dynamic modifications of relationships between entities and servers.

In some cases, the relationships may be changed due to a change in the underlying simulated environment. For example, a water pumping station in a critical infrastructure network simulation might be modified to connect to power output from a mobile generator if power from the electrical grid fails, changing the relationships between the entities. As another example, in a multiplayer game, relationships may be based on physical proximity and based on viewability of other characters and avatars. Hence, when locations of entities change, the relationships may be changed as well.

In some cases, deployment of components to servers may be modified dynamically and affect the relationships. Each server may be tasked with computing the values of specific components, and may be deemed "authoritative" over such components. As an example, server A may be authoritative over component X, and server B may require the value of component X to compute the value of component Y over which it is authoritative. While the simulation is being performed, the deployment of components to servers may change, setting different servers as authoritative over the components, causing a change in relationship between servers. Referring to the example above, if server B is no longer authoritative over component Y, server B may no longer need to receive updates of the values of component X.

One technical solution is to reduce the amount of data transmitted to the central database. Instead of immediately sending every component update to the central database to be retained therein, some immediate updates of components updates may be avoided. In some exemplary embodiments, based on interest definitions of other components that are processed by other servers, different than the server that updated the value of the component, it may be determined whether to provide an immediate update or avoid providing such update. By avoiding sending immediate updates and potentially reducing the amounts of updates sent altogether, there may be a reduced bandwidth utilization between the server and the central database.

In some exemplary embodiments, interest definitions in the component by other components may be tracked. In case no external servers have an interest in the value of the component being updated, the updated value may not need to be distributed to the other servers. Furthermore, the central database itself may not be updated with the current value, as the information may not be required by any server external to the server that computed the new value.

In some exemplary embodiments, the central database may be updated in a non-immediate manner and based on an update frequency requirement of the component being updated. The update frequency requirement may be an aggregation of one or more different update frequency requests by other components. The central database may be updated at a time that is in line with the update frequency request. For example, the update may be sent at the end of the time period dictated by the update frequency requirement (e.g., within no more than 10 seconds from the update, in case of a 10 seconds update frequency requirement). In some exemplary embodiments, an inverse interest list and whether interested components are assigned to different servers may be considered in order to perform the calculations necessary to limit bandwidth for sending updates from a server to the central database.

It is noted that interest update frequencies might be defined in different ways for different Distributed Simulation Systems. While each might not send updates more than once per defined interval, one system might send the latest available update, another might aggregate all updates within the interval into a single message, and another might guarantee that it sends updates that are valid at some time during the latest interval, but not necessarily at the end of that interval. Depending on the particular mechanism by which the platform handles interest update frequencies, inverse interest information would be handled in different ways. For simplicity of disclosure and without limiting its scope, the disclosed subject matter is exemplified using the embodiment where updates are valid at some time during the latest interval, but not necessarily at the end. In this case, servers may transfer updates to the central database at the maximum update frequency of all interested components assigned to different external servers. However, in the case where the latest update is required, a highest common factor of inverse interest frequencies for components on other servers may be computed and used as the send interval. In the case where multiple updates are aggregated and sent at once, multiple updates on servers may be aggregated, sending that message to the central database once per send frequency.

In some exemplary embodiments, an inverse interest list may be determined for a component being updated. The inverse interest list may comprise an identification of components whose values are calculated based on the component. The inverse interest list may be utilized in conjunction with the deployment of components to servers to determine whether any external server has an interest in the component being updated. In some exemplary embodiments, the inverse interest list may be a-priori calculated, such as when the simulation environment is defined or updated, deployment of components to servers is performed or updated, or the like. Such pre-calculations may be used to reduce latency and computation load when the simulation is being performed, enabling a real-time simulation to be implemented. In some cases, the inverse interest list may be updated in response to a modification of component-server deployment. In some exemplary embodiments, modifications of component-server deployment changing the identify of a server responsible for a component whose value is affected by the value of the target component, may cause a change in the inverse interest list. In some exemplary embodiments, if a component whose value is affected by the value of the target component is removed from an external server, that external server may be removed from the inverse interest list (e.g., if not authoritative over another relevant component). Additionally, or alternatively, if the component is added to a second external server, the second external server may be added to the inverse interest list (if not previously appearing there). It is noted that if the component is added to the same server responsible for handling the target component (e.g., not another external server), that server may not be added to the inverse interest list.

In some exemplary embodiments, some components may be defined to be persistent, and included in a snapshot of the simulation. Updates to persistent components may be immediate in the central database, irrespective of whether additional servers require an update of their value. Additionally, or alternatively, the persistent component may be updated periodically, based on a predetermined interval of taking periodic snapshots. A frequency update requirement may be defined based on the predetermined interval. Additionally, or alternatively, the frequency update requirement may also take into account update frequency requests related to other servers or components.

One technical effect of utilizing the disclosed subject matter is to reduce resource utilization by servers participating in a distributed simulation system. In some exemplary embodiments, bandwidth utilization is reduced. In some exemplary embodiments, the disclosed subject matter may reduce the number of updates sent per frame by orders of magnitude, in comparison to naïve implementations in which the central database retains an up-to-date copy of all components.

In some exemplary embodiments, reduced amount of data to be transferred per component may also free up computational resources for such servers and increase the capacity of components to be handled by the same server. In some exemplary embodiments, component-server deployment may be modified to reduce the number of servers required to handle the same number of components.

Additionally, or alternatively, the disclosed subject matter may improve scalability of the distributed simulation systems enabling such systems to handle a larger number of components using fewer servers. In some exemplary embodiments, the disclosed subject matter may be scalable in the number of components as it may not adversely affect the entire system and would not cause a load on the central database, who may act as a middleman for all the servers in the system. Additionally or alternatively, the disclosed subject matter may allow for a decrease in the number of servers, for the same number of components, without adversely affecting the performance of the simulation. In some cases, using the disclosed subject matter, the system may be capable of handling an increase in the number of components that would not be feasible on systems implemented using the naïve implementation.

Another technical effect is a paradigm shift from a complete record of the simulated world on the central database to a Just-In-Time central database, that is made possible through tracking of inverse interest. The Just-In-Time central database may provide a new paradigm where the central database does not retain a complete world state. In fact, each particular data entry in the Entity DB only needs to be up-to-date if it actually needs to be delivered to some worker. Such partial world view requires fewer resources, such as smaller storage space and a reduced bandwidth.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1 showing an environment, in accordance with some exemplary embodiments of the disclosed subject matter.

A distributed simulation system functions by defining a Simulated World 100, which is a collection of entities, each defined by its own data components. For example. Entity 1 (110) comprises Components A and B (112, 114), Entity 2 (120) comprises different components, and so on.

An entity may retain interest definitions. Component processing may require data from other components. For example, the computation of the value of Component 112 may be based on that of Component 122. Such dependency is referred to as an "interested" relationship. Interest List 116 may include a list of all components in which Entity 1 (110) is interested, such as for example Component 122. Interest relationship is a directional relationship. So, although Component 112 is interested in Component 122, Component 122 may not necessarily be interested in Component 112.

It is noted, that in FIG. 1 interest relationship is exemplified in a hierarchy level of an entity. However, the disclosed subject matter is not limited to such hierarchy level and interest lists may be defined per entity, per component, per server processing entities or components, or the like. In some exemplary embodiments, this relationship may be associated with a collection of components or the overall server needing the data and it may be stored exclusively on the worker, on the central database, synchronized between both or the like.

In some exemplary embodiments, the interest list definition may be used to cause the platform to stream target component data changes from the central database into the server processing the interested component or entity. As an example, if Entity 1 (110) requires the data of Component 122 of Entity 2 (120) in order to compute the value of Component 112, then the platform may stream the up-to-date value of Component 122, as determined by another server (not shown) to the server that computes the value of Component 112. In some exemplary embodiments, the data may be first transferred to a central database (not shown) before being sent to the server handling Entity 1 (110).

Inverse Interest List 118 may include a list of all entities that are interested in the components of Entity 1 (110). Similarly, Inverse Interest List 128 includes a list of all entities that are interested in components of Entity 2 (120), such as Entity 1 (110) due to the interest relationship between Component 112 and Component 122.

In some exemplary embodiments, Inverse Interest List 118 may be utilized to avoid transmitting data needlessly. Only components of entities who include in their inverse interest list an indication that another entity, who is processed on another server, has an interest in them, are distributed. Put differently, the system may avoid transmitting the up-to-date values of an entity whose components are not of interest to any entity that is processed by another server. In some exemplary embodiments, the inverse interest list may indicate interest in particular components by other components or entities, and for example, Component 112 may be transmitted to other servers, while Component 114 may not.

Hence, servers may reduce the amount of data they transmit, so as to send data updates for their assigned components to the central database while taking into account whether other servers actually need those updates for their processing. If all interest in a particular component is localized to the server that is authoritative over the component (e.g., the only server that needs access to a component's latest data is the server that is already assigned to process it), then the server need not send that data to the central database. In some exemplary embodiments, in order to avoid this unnecessary data transfer, the interest information is inverted and utilized. For each component, it may be tracked whether some other server requires its data updates and use that information to define whether the server sends updates.

Figure 2:
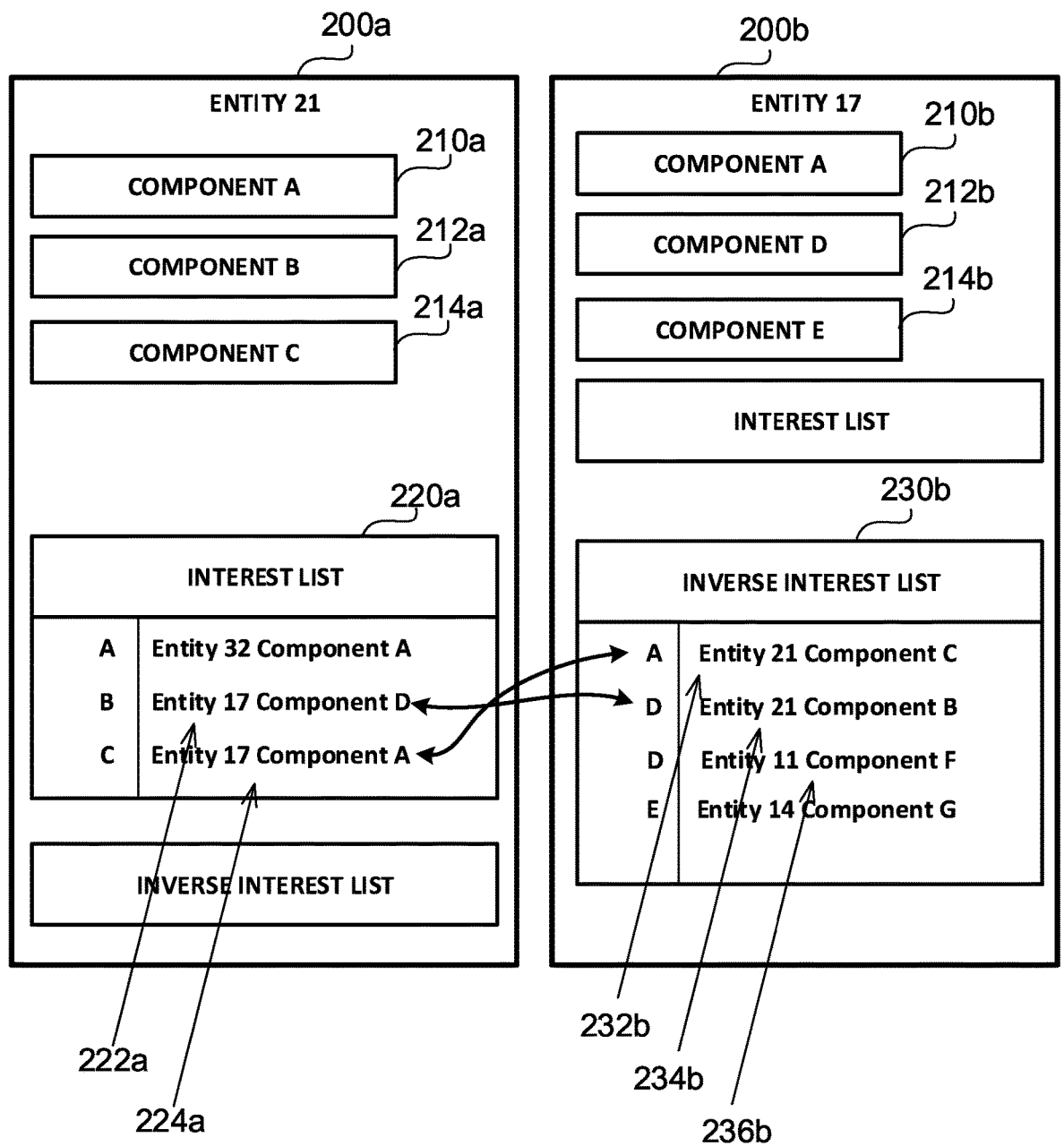
FIG. 2 shows an environment, in accordance with some exemplary embodiments of the disclosed subject matter.

FIG. 2 shows Entity 200a and Entity 200b and exemplifies the Interest List as well as the inverse interest list. Each entity comprises components (210a, 212a, 214a of Entity 200a; 210b, 212b, 214b of Entity 200b).

Interest List 220 of Entity 200a lists which components the components of Entity 220a are interested in. Specifically, Component 210a is interested in Component A of Entity 32 (not shown); Component 212a is interested in Component 212b of Entity 200b (Line 222a); and Component 214a is interested in Component 210b of Entity 200b (Line 224a).

Inverse Interest List 230b shows the inverse relationship. Put differently, Inverse Interest List 230b indicates if other components are interested in the components of Entity 200b. Specifically, regarding Component 210b, Inverse Interest List 230b indicates that Component 214a is interest therein (Line 232b). Regarding Component 212b, two different interested components are listed: Component 212a of Entity 200a (Line 234b) and Component F of Entity 11 (Line 236b). Regarding Component 214b, it is shown that one component—component G of Entity 14 (not shown)—is interested therein.

As can be seen in FIG. 2, Line 222a of Interest List 220a is reflected in Line 234b in Inverse Interest List 230b. Similarly, Line 224a of Interest List 220a is reflected in Line 232b in Inverse Interest List 230b.

Figure 3A:
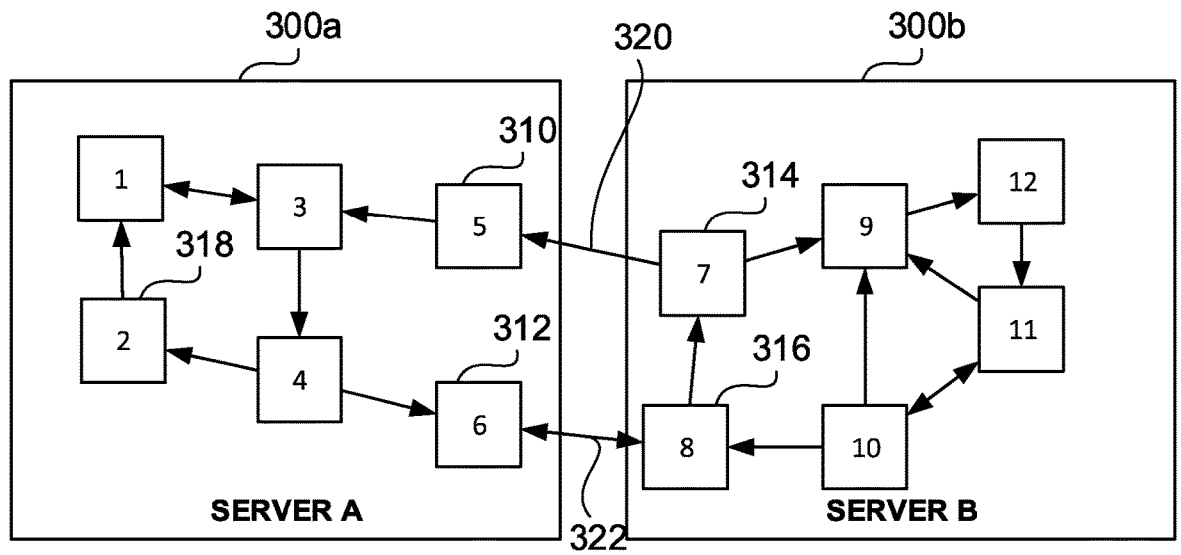
FIG. 3A shows an illustration of a simulated world, in accordance with some exemplary embodiments of the disclosed subject matter.

Referring now to FIG. 3A showing an illustration of a simulated world, in accordance with some exemplary embodiments of the disclosed subject matter. FIG. 3A shows a simple simulated world comprising 12 components denoted 1 . . . 12, such as Component 2 (318), 5 (310), etc. An interest relationship is denoted using directional arrows. For example, Component 316 is interested in the value of Component 314.

The system's load balancer may deploy the 12 components to two servers (300a, 300b). As can be appreciated, most interest relationships are internal to either one of the servers. For example, the relationship between Component 316 and Component 314 is internal to Server 300b. However, some components are of interest externally to their assigned server. Specifically, Edges 320 and 322 show three such inter-server relationships (Component 314, which is deployed on Server 300b, being interested in Component 310, which is deployed on Server 300a; Component 316, which is deployed on Server 300b, being interested in Component 312, which is deployed on Server 300a; and Component 312, which is deployed on Server 300a, being interested in Component 316, which is deployed on Server 300b).

Figure 3B:
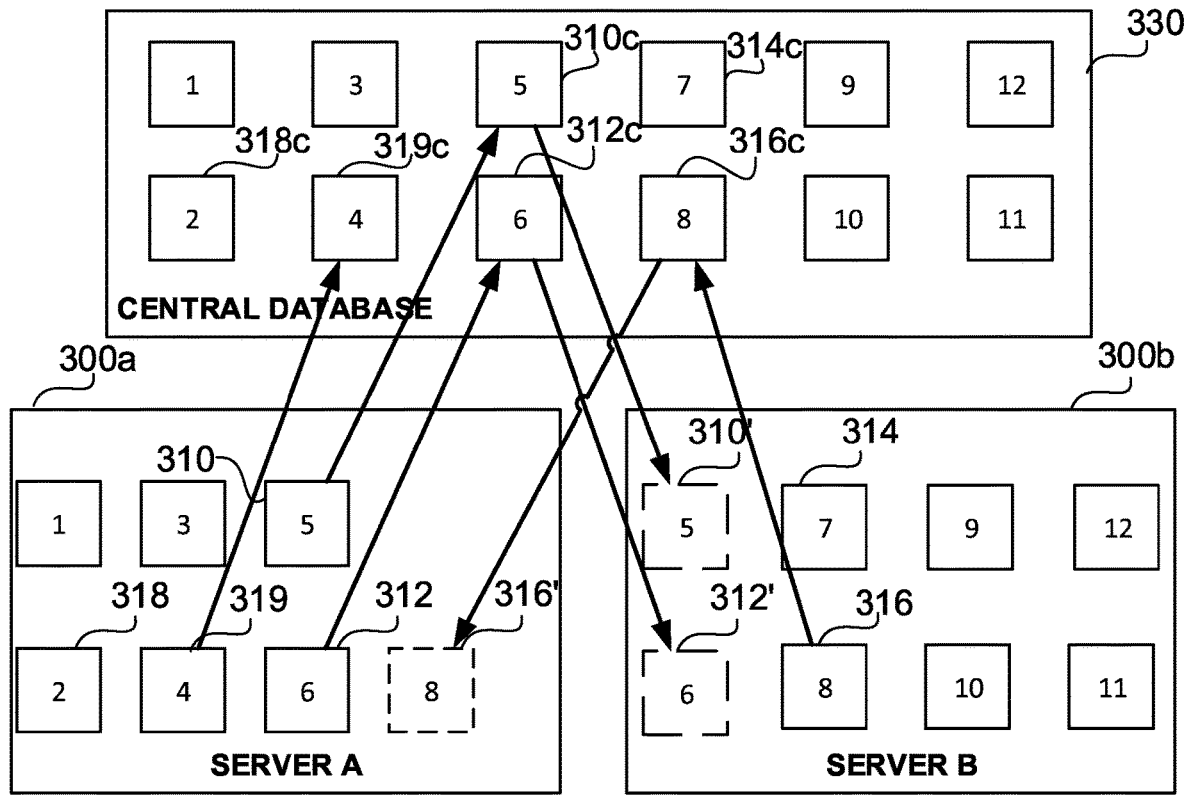
FIG. 3B shows an illustration of a computerized environment, in accordance with the disclosed subject matter.

FIG. 3B shows an illustration of a computerized environment handling the simulated world of FIG. 3A, in accordance with the disclosed subject matter Besides Servers 300a 300b, the environment also comprises Central Database 330 who is tasked with retaining a copy of the values of the different components. Each server sends updates to Central Database 330, who, in turn, broadcasts updated values to relevant servers. It is noted that in a naïve implementation, upon an update of each component, the relevant server updates the central database, so as to keep the central database up-to-date. Even if the central database only distributes the relevant data to subscribed servers (e.g., servers who require the data for their processing) and no such servers are currently subscribed, still the naïve implementation requires that the central database will be made up-to-date.

FIG. 3B, instead, illustrates the advantage of the disclosed subject matter. Instead having Server 300a update Central Database 330 with each update it has, only those updates who would be distributed to other servers are transmitted to the Central Database 330. For example, When Server 300a updates Component 312, Central Database 330 is updated and its retained copy (312c) is updated accordingly. The information is then passed to Server 300b, and retained therein (312') to allow Server 300b to compute the value of Component 316. Similarly, as Component 314 requires the value of Component 310, updates of such component are transmitted to Central Database 330, retained therein as 310c and sent to Server 300b (310'). As another example, and in order for Component 312 to be processed, the value of Component 316 is transmitted via Central Database 330 (316c) and to be retained as a copy locally (316'). On the other hand, when Component 314 is updated, as all components in its inverse interest list are internally within the same server, Server 300b, its updated value need not be reported to Central Database 330. Component 314c in Central Database 330, which is a copy of Component 314, may not be kept up to date. In some cases, such copy may be dropped altogether. The same goes for Component 318 and its copy at the Central Database 330, 318c.

In some exemplary embodiments, some components may be persistent. Reports of updates of persistent components may be performed even if no additional server is interested in their value, so as to enable Central Database 330 to obtain a snapshot of the simulated world. For example, Component 319 may be considered persistent and although only components in Server 300a are interested in its value, Server 300a may still report updates in its value to Central Database 330 to be retained therein (319c).

In some cases, instead of keeping the values of the persistent components up-to-date, the system may poll for up-to-date values in an on-demand manner, when a snapshot is desired. For example, in response to a user instruction to create a new snapshot, Central Database 330 may instruct all servers to send up-to-date values of all persistent components they are authoritative over. Additionally, or alternatively, the instruction may be with respect to only a portion of the persistent components—the portion that includes all persistent components in which there is no inter-server interest (e.g., Component 319 but not Component 312, assuming both are persistent).

As can be appreciated from this illustration, by avoiding to update the state in Central Database 330 for all components, a significant reduction in data transmission is achieved. If every component is reported to Central Database 330 in each frame, Servers 300a 300b should, potentially, send 12 updates per frame. However, as can be extracted from the interest relationships, only updates for components 310, 312 and 316 are actually being sent to another server. If a server tracks which components are interested in each of its assigned components and checks whether they are assigned to a different server, it can then choose not to send component updates to the central database 330 if all interested components are local. In this example, only 3 updates are sent per frame, instead of 12 updates. Hence, data transmission is reduced to 25%.

Figure 4A:
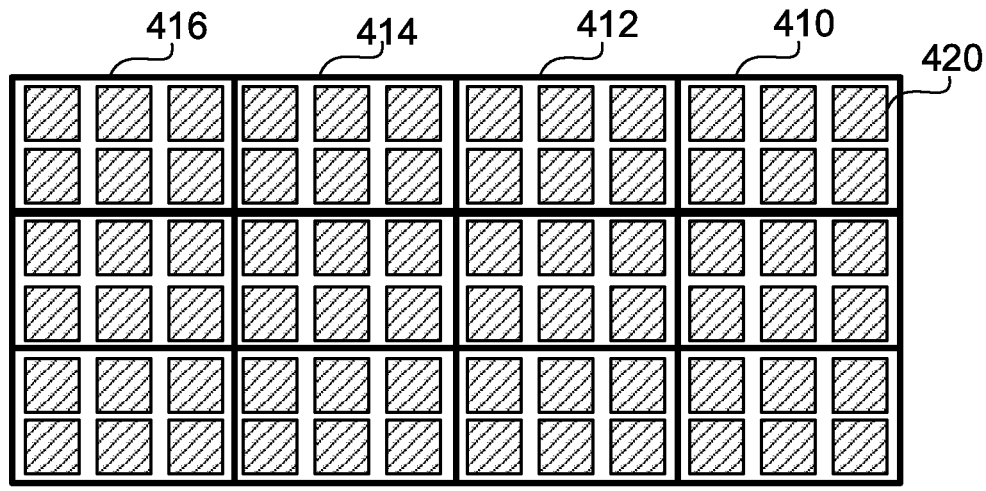
FIGS. 4A and 4B show illustrations of two configurations of servers utilized in simulating a 72-entity simulated world, in accordance with the disclosed subject matter.
Figure 4B:
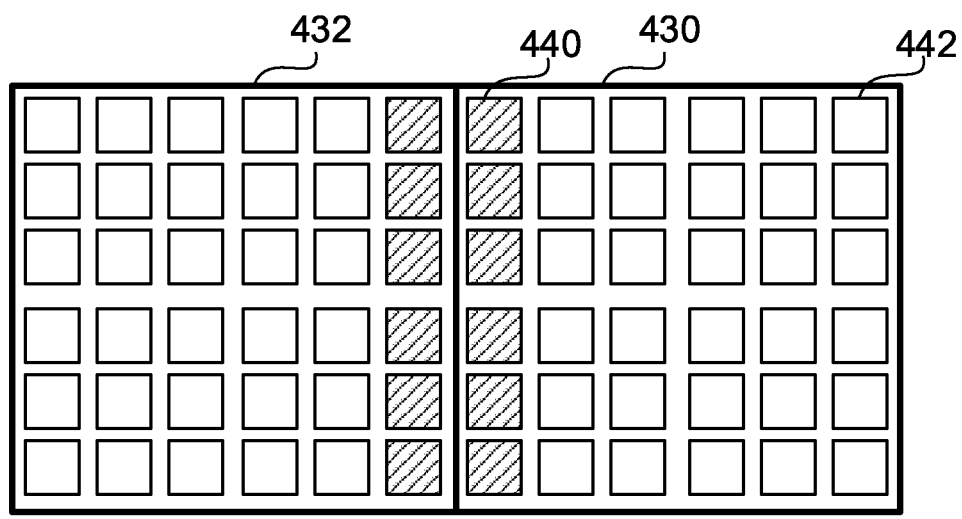

Referring now to FIGS. 4A and 4B illustrating two configurations of servers utilized in simulating a 72-entity simulated world, in accordance with the disclosed subject matter. The simulated world may have interest relationships that are based on adjacency. In this illustrated example, there is a bandwidth limitation that allows for a maximum of 6 updates to be transferred per server per frame and that every component on every server is updated every frame. In FIG. 4A, each component update is reported. Hence, due to bandwidth limitations, each server can only process up to 6 components, leading to a total of 12 server required to simulate the world. As an example, Servers 410, 412, 414, 416 each are authoritative over 6 components, such as Component 420.

In FIG. 4B, only updates that are of interest for components that are handled by an external server are reported to the central database (not shown). In this example, two servers suffice to handle the entire simulated world—Servers 430, 432. Only 6 components of each server, illustrated with a filled pattern, require to be reported to the central database. For example, updates in Component 440 are reported as they are required for the computations of the adjacent components in Server 432, while updates of other components, such as Component 442, are not reported. In this example, the improvement decreases hosting resources and required physical servers by 83%.

While this is a simplified example, interest may in many cases be related to physical proximity. For this reason, when applying the disclosed subject matter, the component updates transferred may typically come from entities along the borders of each server region. In this scenario, the efficiency increase is related to the ratio of the area of the server space to its circumference. In FIG. 4A the number of components per server increases linearly with bandwidth limitation, but in the configuration of FIG. 4B, it increases as the square of this limitation. The higher the bandwidth limit, the more significant the reduction in required servers and resources.

In some exemplary embodiments, the efficiency gained by applying the disclosed subject matter may be affected by a large number of factors. In an example scenario, bandwidth limitations might limit servers to transmit up to 10,000 updates per second. In this scenario, entities may be spaced roughly in a grid over the managed region of each server and only the entities in the outer row may be part of cross server interest relationships. Furthermore, a server might update a particular component type for every entity every frame at the rate of 60 Hz typically used in gaming applications. Finally, a typical worker may manage a square, non-boundary region within the simulated world such that it borders the regions assigned to other servers on all four sides. If we were to use the naïve solution, a server could then manage a single component type at 10,000 updates/60 frames for 166 entities per server. However, if the disclosed subject matter is employed, and the number of entities along one edge is defined as n, the requirement may generally be: 4 sides*n updates/frame-side*60 frames/sec<10,000 updates/sec. This gives us n=41 edge entities for a total of n*n=1681 entities per server. In other words, a single server manages ten times as many components, such that using the disclosed subject matter allows a decrease in server use and corresponding costs of approximately 90% in comparison with the naïve solution.

It is noted that the discussion above is focused on a two-dimensional simulated world, for explanation purposes only. Savings may vary depending on world dimensionality and the shape of the region assigned to the server. For a long narrow world approximating a single dimensional simulation, the effect of the improvement may be magnified ad infinitum. In a single dimensional simulation, with only a single entity on each end of a server's assigned entities participating in cross server interest relationships, the naïve solution would still limit to 166 entities per server. The disclosed subject matter, however, enables the system to assign unlimited entities to the server, without altering the requirement to send only those component updates for the entities at the two ends of the line to the central database. In this case, bandwidth no longer imposes any restriction on the number of entities managed per server. The limiting bottleneck becomes the processing power of the server. This is highly dependent on the server, but can exceed 100,000 entities for relatively complex optimized processing and even move into the millions for simple processing cases. The decrease in server resource requirements for such a single dimensional case could surpass 99.9%.

Figure 5A:
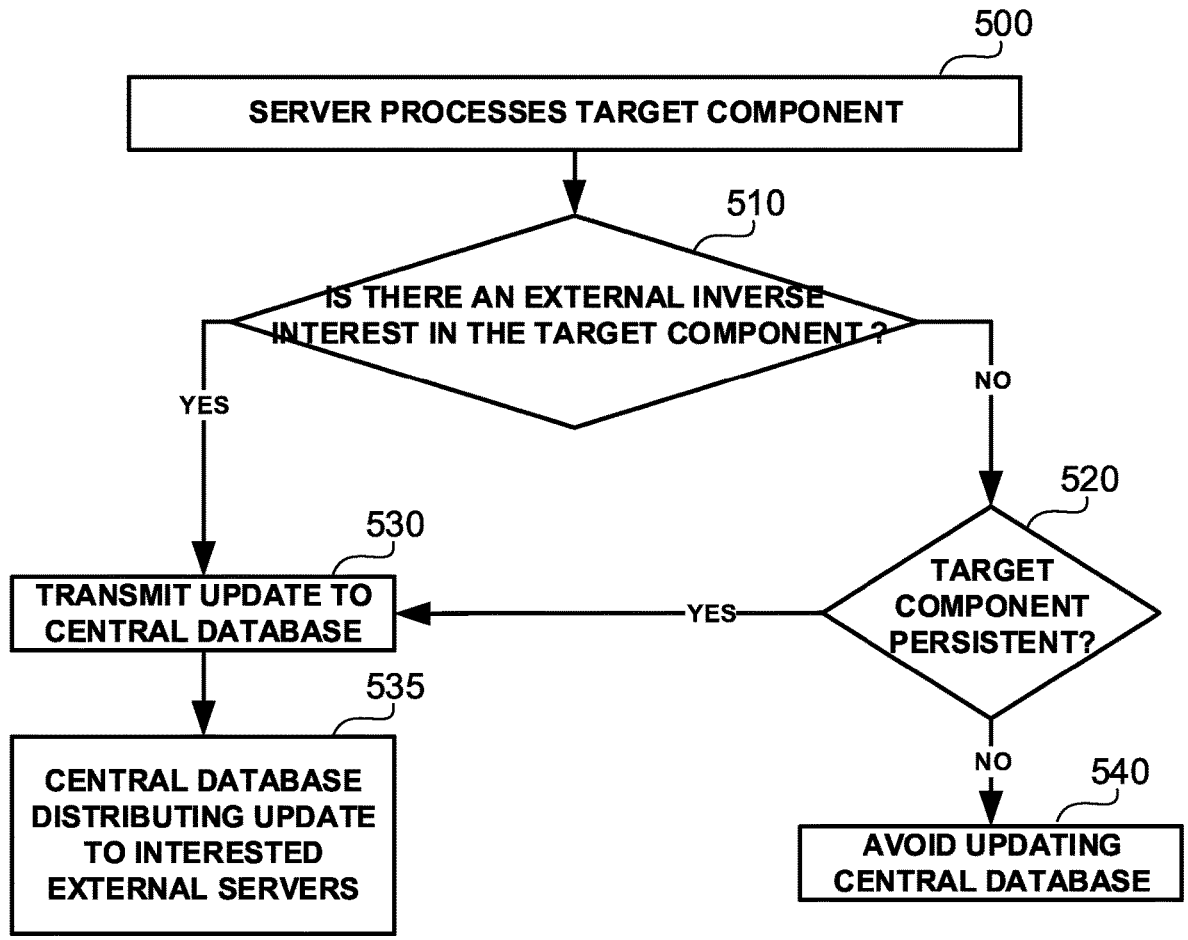
FIG. 5A illustrates a flowchart diagram of a method, in accordance with some exemplary embodiments of the disclosed subject matter.

Referring now to FIG. 5A showing a flowchart diagram of a method, in accordance with some exemplary embodiments of the disclosed subject matter.

On Step 500, a server may process a target component. The server may be a server that is authoritative over the target component and is therefore tasked with processing its value. In accordance with the processing of the target component, a new value thereof may be determined by the server.

It is noted that the server processing the target component may be any computing device that is connected to the distributed simulation system, including but not limited to cloud server, a virtual server, an end-client device or the like. Specifically, in a multi-player game, the end device of the user may be a server that is authoritative over components relating to the avatar of the user, such as location, view angle, speed, activity, or the like. Such components are controlled by the user. The affects of the user's action may be processed by other servers or by the same server.

On Step 510, it may be determined whether the updated value is required by another server. In some exemplary embodiments, an inverse interest in the target component may be identified using an inverse interest list. If that inverse interest is related to an external server, that may be indicative of a requirement to propagate the change to the central database and from there to the external server. It is noted that an inverse interest in the target component by a component that is also processed by the same server processing the target component is not considered "external" and does not cause the server to provide an update to the central database. In some exemplary embodiments, the inverse interest list may be pre-calculated, such as when the component-server deployment is determined, when the interest definitions of components are defined, or the like. Additionally, or alternatively, a mask flag may be used to indicate whether target component updates should be reported to the central database. This mask flag may be a-priori calculated and utilized to reduce computations required at runtime. In some exemplary embodiments, the mask flag may or may not also relate to the determination of Step 520.

In some exemplary embodiments, it is sufficient that one external component will be interested in the target component to cause the central database to track the up-to-date value of the target component.

In a case where the outcome of Step 510 is that there is no external inverse interest in the target component, an additional determination may be made on Step 520. On Step 520, it may be determined whether the target component is persistent. In some cases, the persistent component may be included in a snapshot of the simulated world. In some exemplary embodiments, values of persistent components may be kept up-to-date in the central database even if there is no external inverse interest therein in other external servers. If the target component is persistent, as well as if there is an external inverse interest in the target component, Step 530 may be performed. Otherwise, Step 540 may be performed.

On Step 530, the server may transmit an immediate update of the new value to the central database. The server may transmit an update command that invokes an update of the value of the copy of the target component that is retained in the central database.

On Step 535, after the copy in the central database is updated, interest definitions may be utilized to determine to which external servers the updated value needs to be transmitted. In some exemplary embodiments, every server that is different than the server that processed the target component, and that is authoritative over a component that is interested in the target component (e.g., utilizes the value of the target component for the processing thereof) may be updated by the central database. In some exemplary embodiments, a publish-subscribe protocol may be utilized to disseminate information and each server may subscribe on the components that are required for its processing. Once such a component is updated, the publish-subscribe protocol may be utilized to broadcast the update to the interested servers.

On Step 540, it may be determined that the central database need not be updated with the new value of the target component.

As can be appreciated, the server is configured to selectively transmit updates of components to the central database based on the inverse interest list and based on the component-server deployment.

Figure 5B:
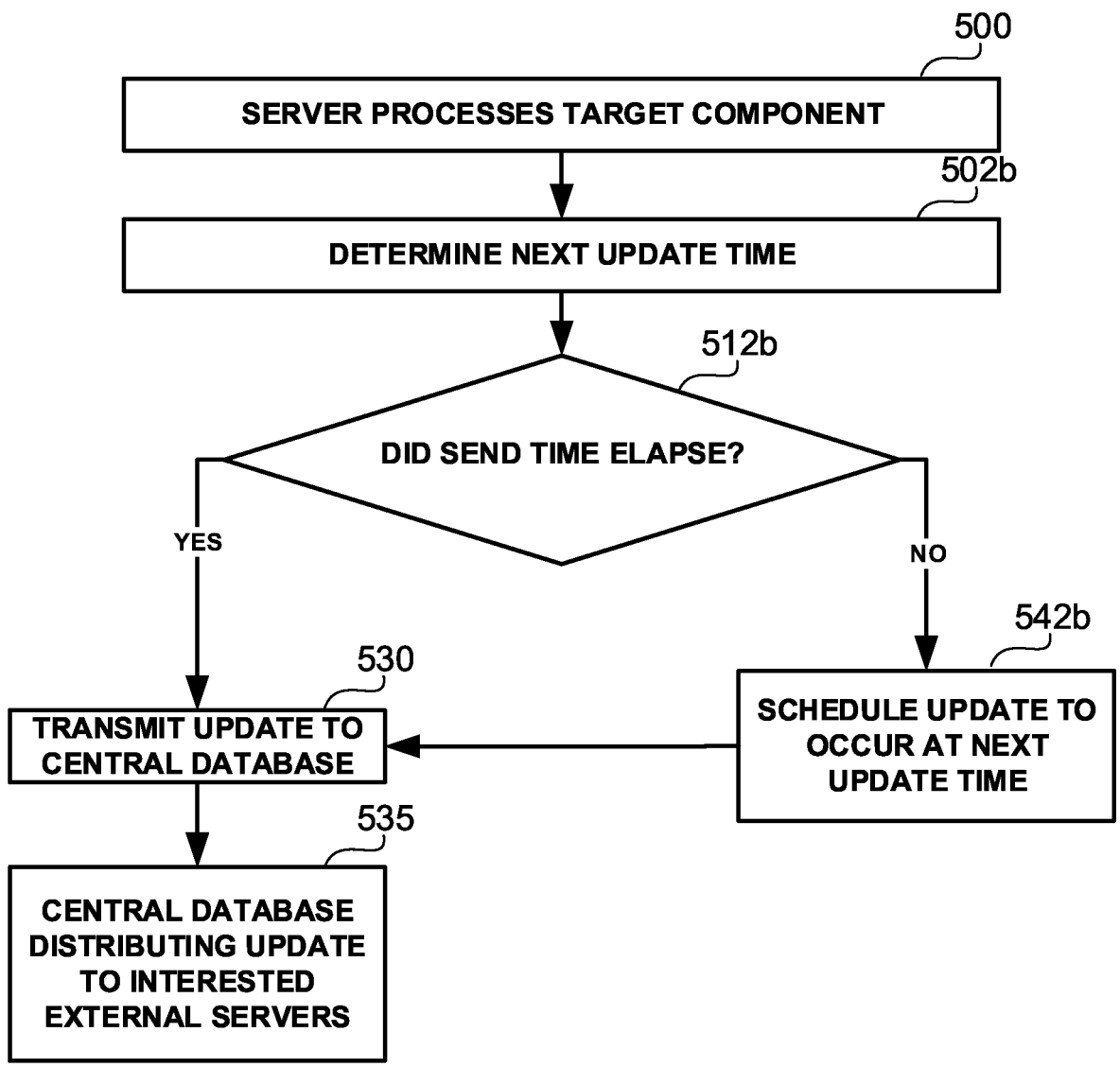
FIG. 5B illustrates a flowchart diagram of a method, in accordance with some exemplary embodiments of the disclosed subject matter.
Figure 6A:
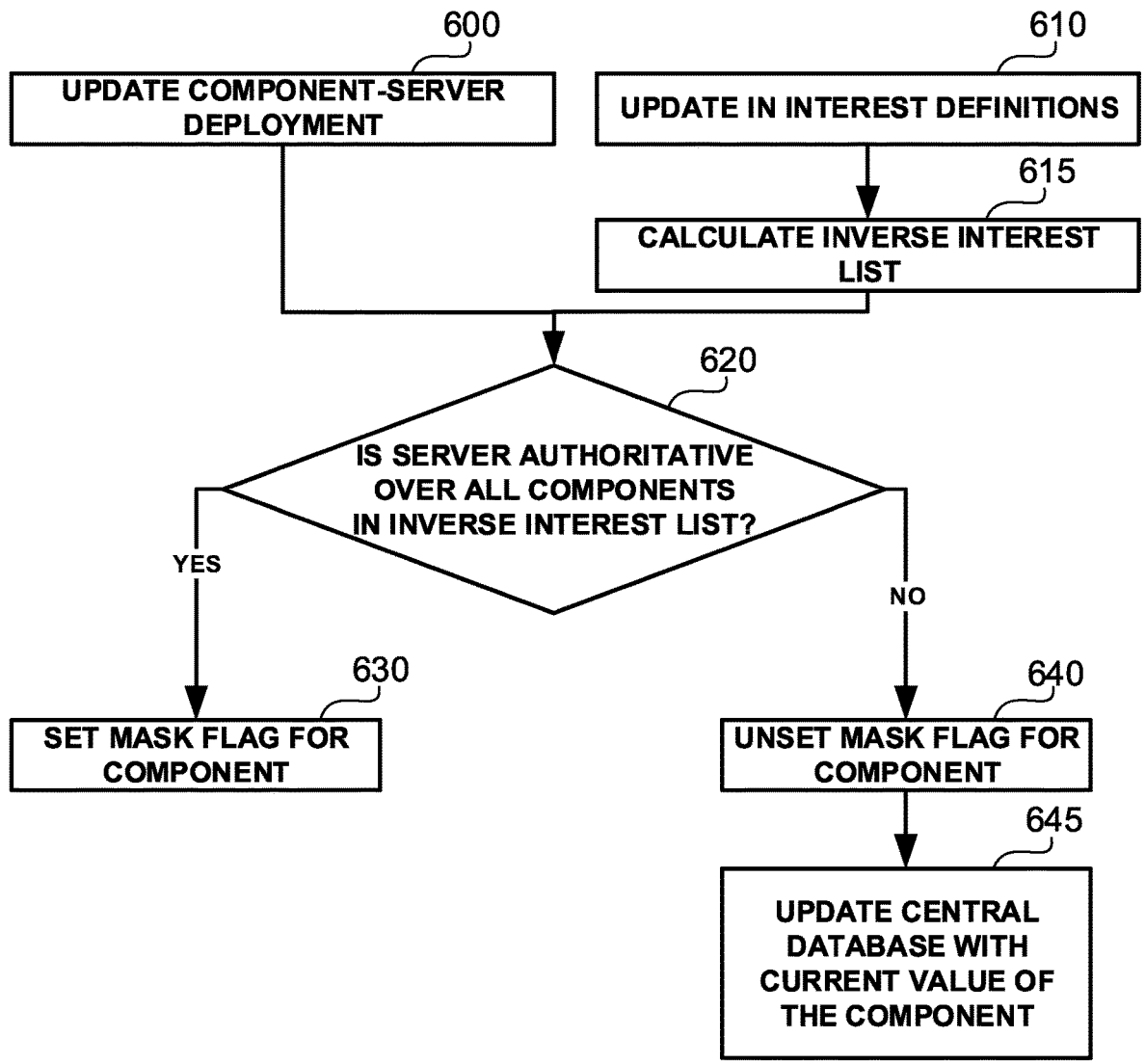
FIG. 6A illustrates a flowchart diagram of a method, in accordance with some exemplary embodiments of the disclosed subject matter.

Referring now to FIG. 6A showing a flowchart diagram of a method, in accordance with some exemplary embodiments of the disclosed subject matter. The method of FIG. 6A may be performed in advance and before the components are processed. By performing such computations a-priori and in advance, the disclosed subject matter provide a performance improvement to reduce computations that are performed with every update of each component (e.g., in accordance with the method depicted in FIG. 5). Instead, FIG. 6A shows pre-computations to determine a value of a flag, referred to as a "mask flag". In some exemplary embodiments, a mask flag may be stored in the memory of the server for each component for which the server is authoritative. In some exemplary embodiments, some components may be constantly masked or not masked and for such components, no mask flag may be retained.

On Step 600, a component-server deployment is updated. Component-server deployment may dictate which server is authoritative over which component. In some exemplary embodiments, the deployment may be the initial deployment of the distributed simulation system. Additionally, or alternatively, the deployment may be an updated deployment, changing a pre-existing deployment. A new component-server deployment may mean that previously calculated mask flag values for components may no longer be valid. Accordingly, as is depicted in FIG. 6A, in response to such update, the mask flag may be calculated (and potentially changed).

In some exemplary embodiments, if a server becomes authoritative over a component, the mask flag of that component may need to be calculated. This is because the deployment of the component on a specific server may dictate whether interest in the component, by another component, is external or not.

Additionally, or alternatively, if a server becomes authoritative over a component X, the mask flag of components that component X is interested in may require updating. This is because the new deployment may affect whether the inverse interest of the component X is external with respect to the other components. In some exemplary embodiments, the computation may be performed both for cases where a server becomes authoritative over a component and for cases where a server stops being authoritative over a component.

In some exemplary embodiments, in case many component authorities change at once, the disclosed subject matter may only update mask flag values once for each component that any of them are interested in.

In some exemplary embodiments, a particular component's interest may be identified directly according to its interest component, or indirectly by maintaining an interest lookup table on the server with component identifiers for keys and a list of the server assigned components the component is interested in as values. This list would then be updated whenever there is an update to interest definitions of the simulated world.

On Step 610, an update in interest definitions is implemented. In some exemplary embodiments, component X may become interested in component Y. As an example, a command Interest (X,Y) may be transmitted to inform the distributed simulation system of this change in the underlying interest definitions of the simulated world. Additionally, or alternatively, component X may no longer be interested in component Y. In such a case, NotInterested(X,Y) command may be transmitted. The commands may be transmitted to the server that is authoritative over component Y. Such server may update the inverse interest list it retains locally (Step 615), such as by adding components that are interested in Y to the list or removing components that stopped being interested in Y from the list.

It is noted that the interest definition commands cross server boundaries. Accordingly, they constitute additional server communication, counteracting some of the disclosed subject matter's bandwidth savings. In general, scenarios where component updates occur more frequently than changes to interest in those components may be better suited to benefit from the disclosed subject matter. This bandwidth cost may be mitigated by aggregating several commands together to include a list of entity components with changing interest definitions rather than only one in each command. Furthermore, other scenario characteristics may be leveraged to replace these commands. For systems that involve networked entities, inverse interest lists may be preprocessed, built in advance of run time and loaded during initialization, saving the need to send Interested( ) or NotInterested( ) commands in the bootup process. As another example, symmetric interest relationships schemes (e.g., A is interested in B and vice versa) may be used to reduce transmission of interest update commands Where a symmetric interest relationship exists, it may be marked as such. In that case, no command need be sent. The server handling Component A would simply act as if it had received the corresponding command from component B when its interest in component B changed.

On Step 620, for each component who is potentially affected (e.g., component whose inverse interest list was changed on Steps 600, 610 or 615), it may be determined whether the same server that is authoritative over the component is also authoritative over all the components in the inverse interest list thereof. In some exemplary embodiments, if there is at least one component that has a different authoritative server, than there is an external inverse interest in the component.

In case an external inverse interest does not exist, Step 630 may be performed, in which the mask flag may be set for the component. Accordingly, when Step 510 of FIG. 5 is performed, the value of the mask may indicate a "no" result. It is noted that in some cases, the mask flag may also be determined based on whether the component is persistent, so as to provide a single decision point in FIG. 5 that combines both the determination of Step 510 and that of Step 520.

In case an external inverse interest does exist, Step 640 may be performed. On Step 640, the mask flag may be unset for the component, therefore indicating that updates to the component should be reported immediately to the central database.

On Step 645, an immediate update of the current value of the component may be provided to the central database. In some exemplary embodiments, if the up-to-date value of a component was not being reported to the central database before, and due to a component-server deployment change or a change in the interest definitions, the value of the target now needs to be updated, the current value of the component may be reported to the central database without waiting for the component's next update. By doing so, the partial world state retained in the central database is updated to reflect the correct value of the component whose value was previously changed and not reported immediately.

Referring now to FIG. 5B showing a flowchart diagram of a method, in accordance with some exemplary embodiments of the disclosed subject matter. In FIG. 5B, a component's update is not merely a Boolean decision—yes or no. Instead, the update frequency is determined. In some exemplary embodiments, a distributed simulation system may include interest relationships that are not simply Boolean. An interest relationship may be defined with a minimum frequency of component updates that need to stream into a particular interested component's assigned server. The disclosed subject matter may track not only whether a component is interested, but also its interest update frequency. The maximum update frequency of all interested components that are assigned to a different server may then be calculated, and such component updates transferred to the central database at that frequency.

In some exemplary embodiments, the distributed simulation systems may save periodic snapshots at a predetermined interval (e.g., every 1 minute, every 30 minutes, or the like). In such embodiments, all updates to persistent components may be transferred to the central database at least at the frequency of snapshot capture. In some exemplary embodiments, when periodic snapshotting is active, for component data marked as persistent, the server may allow send frequency values that are equal to or greater than that upholding the snapshot-induced minimal frequency, which is based on the predetermined interval.

On Step 502b, a next update time for the target component is determined. In some exemplary embodiments, the determination may be based on a pre-calculation of the update frequency requirement of the target component. Additionally, or alternatively, the determination may include calculating the update frequency requirement of the target component. In some exemplary embodiments, using the update frequency requirement, and in view of the last update time, the next update time may be determined. As an example, if the update frequency requirement requires an update no more than once in one minute, the next update time may be the last time in which the value was updated increased by one minute. As another example, the next update time may be one minute from the current time, if no previous unreported update was made, but remain unchanged if there is a previous unreported update. Other computations of the next update time may be implemented in view of the specific details and semantical meaning of the update frequency requirement (e.g., update at no more than a desired frequency, update at a precise desired frequency, update of the up-to-date value every predetermined time interval, or the like). In some exemplary embodiments, a periodic update determination may be set by the server based on the send frequency.

On Step 512b, it is determined whether the next update time has already elapsed. If so, Steps 530 and 535 are performed. If the update time has not yet elapsed, an update is scheduled to occur at the computed next update time (Step 542b). When such time arrives, Steps 530 and 535 are performed. It is noted that if an update was already scheduled and not yet performed, no additional update may be scheduled. When the update time is reached, the up-to-date value, which may have already changed, may be reported and not necessarily the value which was set when the update was scheduled. In some exemplary embodiments, the server is configured to periodically transmit to the central database an update of the target component that was not previously transmitted.

Figure 6B:
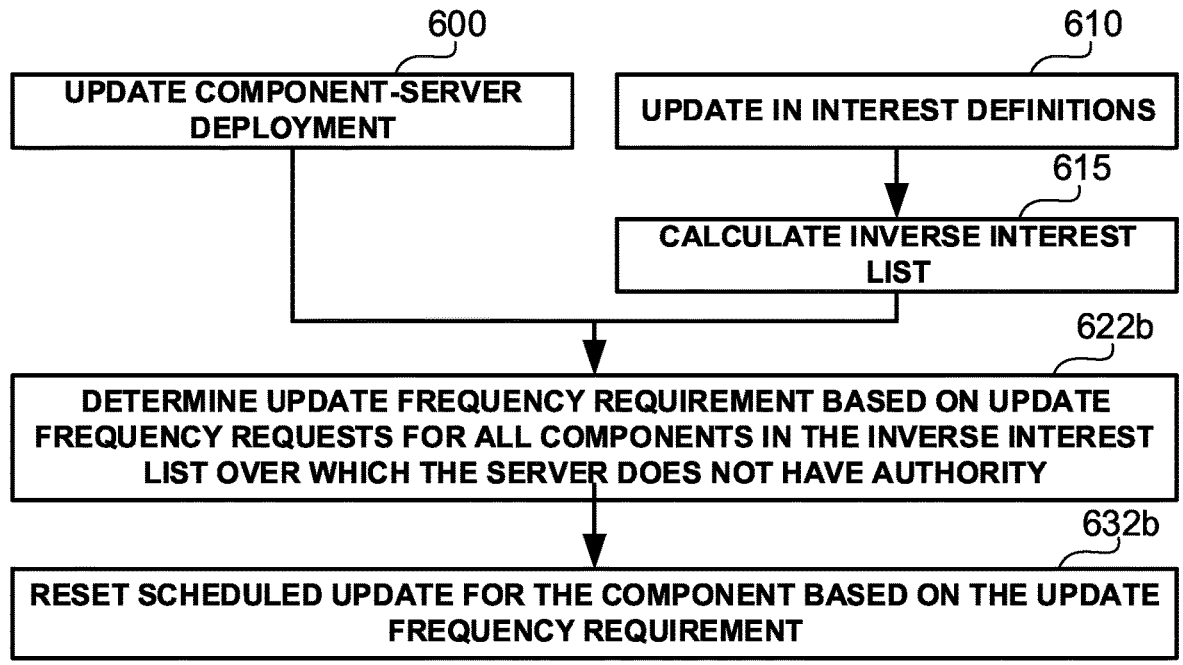
FIG. 6B illustrates a flowchart diagram of a method, in accordance with some exemplary embodiments of the disclosed subject matter.

Reference is now made to FIG. 6B, which illustrates a flowchart diagram of a method, in accordance with some exemplary embodiments of the disclosed subject matter.

In response to a deployment change (600) or interest definitions (610-615), an update frequency requirement may be determined. In some exemplary embodiments, the interest definitions may comprise for each interest relationship, an update frequency request indicating a minimal update frequency required that the interested component should receive. In some exemplary embodiments, an update frequency request may also indicate a non-interest relationship, such as using a constant predetermined value (e.g., 0, −1 or the like).

On Step 622b, an update frequency requirement may be determined for each component who was affected by the modifications of Steps 600, 610 or 615. For each such component, the update frequency requirement may be determined based on the update frequency requests of other components that are handled by external servers other than the server that is authoritative over the component. As an example, the maximal frequency between all the update frequency requests may be identified and used as the update frequency requirement of the component. For example, if component A requests an update of the value of Component X every 5 seconds, component B requests an update of the value of Component X every 15 seconds, and component C requests an update of the value of Component X every 1 minute, then the update frequency requirement may be set to the highest update frequency request, i.e., shortest update interval every 5 seconds. In some exemplary embodiments, the update frequency requirement of persistent components may be computed similarly but while also taking into account the time interval of the periodic snapshot, as if such snapshot related requirement is another update frequency request of a component that is handled externally.

On Step 632b, a previously scheduled update transfer for the component is reset in accordance with the new update frequency requirement. As a result, the scheduled time may be delayed to a later time (e.g., when the new update frequency requirement is lower than the previous update frequency requirement) or expedited to an earlier time (e.g., when the new update frequency requirement is higher than the previous update frequency requirement).

Figure 6C:
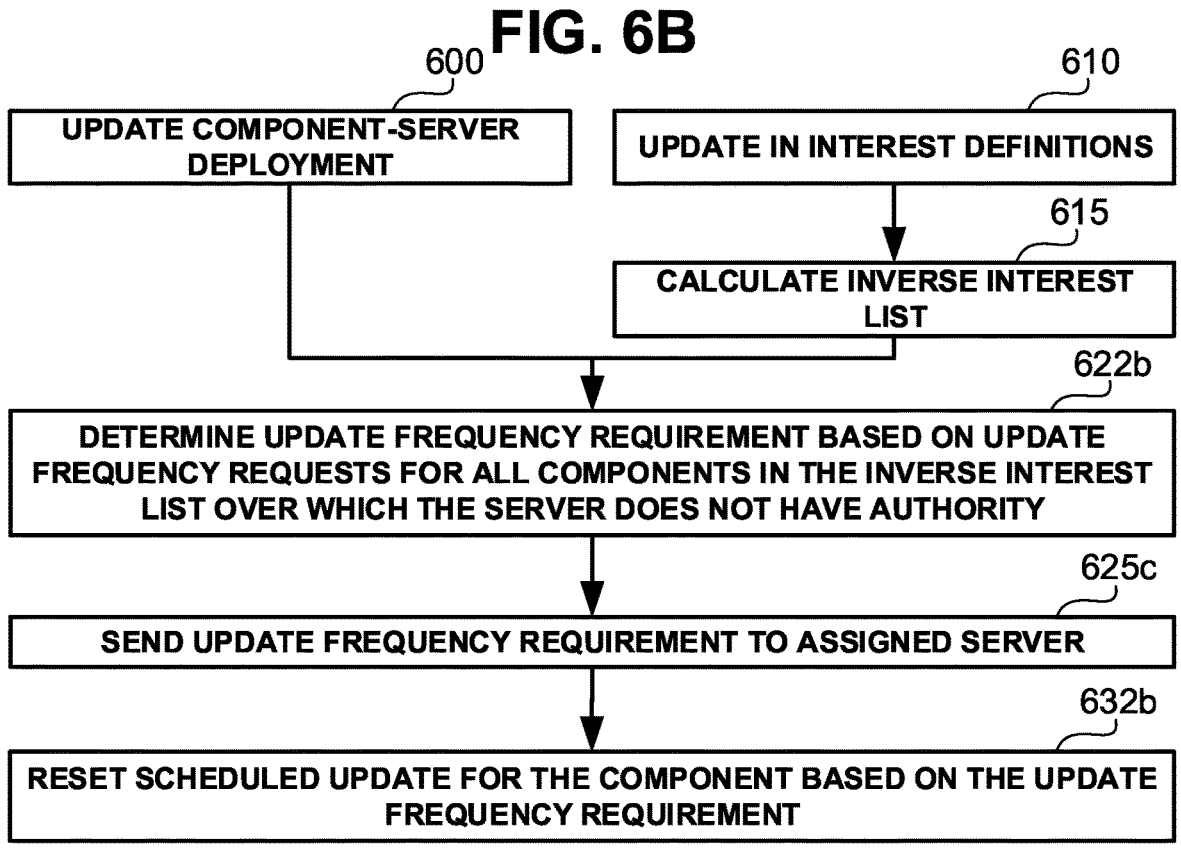
FIG. 6C illustrates a flowchart diagram of a method, in accordance with some exemplary embodiments of the disclosed subject matter.

FIG. 6C shows a flowchart diagram of a method, in accordance with some exemplary embodiments of the disclosed subject matter. FIG. 6C illustrates an embodiment in which central database-side and server-side processing is performed. By implementing most of the inverse interest subroutines on the central database side, the complexity of incorporating these bandwidth savings can be included in the distributed simulation system platform itself and hidden from developers that use it. Additionally, the mechanism can support a larger range of interest query types.

In FIG. 6C, Steps 600-622b may be performed by the central database. After the new update frequency requirement is determined in Step 622b, if the requirement is modified (e.g., set for the first time, or set to a different value than a previous value), the central database may send the new update frequency requirement to the server who is authoritative over the component. Step 632b is then implemented in the authoritative server.

It is noted that the extra step of transmitting the new update frequency requirement may add a slight lag to target component delivery times. However, this lag may be negligible considering that it only adversely affects the updating of the update frequency requirement and not the transmission of the new values of components themselves.

Figure 7:
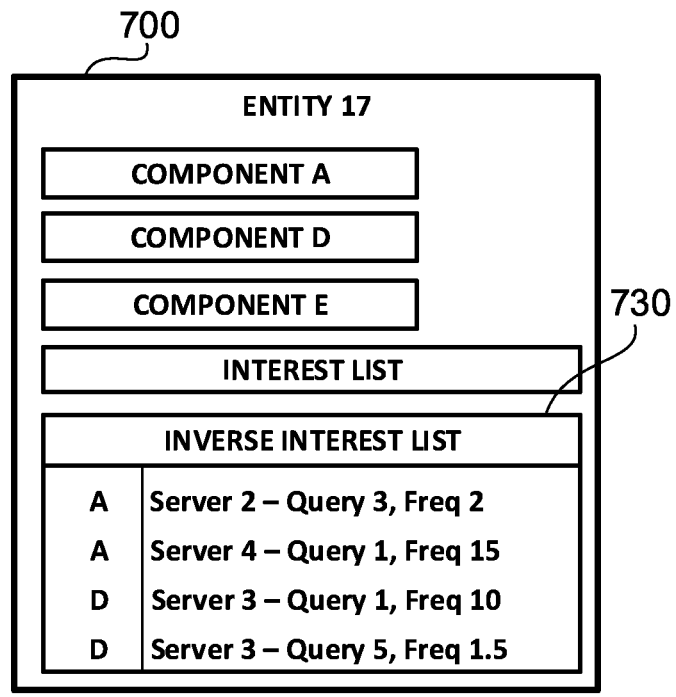
FIG. 7 shows an illustration of a data structure used in central database-side processing, in accordance with some exemplary embodiments of the disclosed subject matter.

Referring now to FIG. 7, which shows an illustration of a data structure used in central database-side processing, in accordance with some exemplary embodiments of the disclosed subject matter. Data Structure of Entity 17 (700) is similar to that shown in FIG. 2 (200b). Inverse Interest List 730 of Data Structure 700 is adapted to central database-side processing.

As central database-side processing is performed, interest queries are associated with the server to which the query results will be delivered. Additionally, or alternatively, queries may be aggregated in central database-side processing. Inverse Interest List 730 may include server/query identifiers instead of entity/component identifiers. Each entry in Inverse Interest List 730 may include a server identifier (e.g., Server 2), a query identifier (e.g., Query 3) and its required update frequency (e.g., Freq 2). As queries are added and removed and query results change, Inverse Interest List 730 may be updated. Calculation of a particular component's update frequency requirement may be based on the maximal update frequency request of a query in the Inverse Interest List 730 that is associated with servers that are not assigned to the component. Changes to this update frequency requirements may be sent over the network to the server assigned to the component.

In some exemplary embodiments, entity/component identifiers may be replaced with server/query identifiers for the purposes of efficiency. In some exemplary embodiments, multiple component defined interests may be aggregated into one server query in central database-side subroutines. As a result, the size of the inverse interest list may be relatively reduced as several entries may be aggregated together.

In some exemplary embodiments, the disclosed subject matter may support expression-based interest queries. Expression-based interest queries may be queries that express interest in some component type based on whether some function of component data from its owner entity lies in some range. One notable example of expression-based interest is interest in some component type of nearby entitles: "return: all components of a certain type, select: entities whose position components lie in a certain region." In some exemplary embodiments, central database-side implementation may have the added benefit of efficiently inverting expression-based interest queries.

Figure 8:
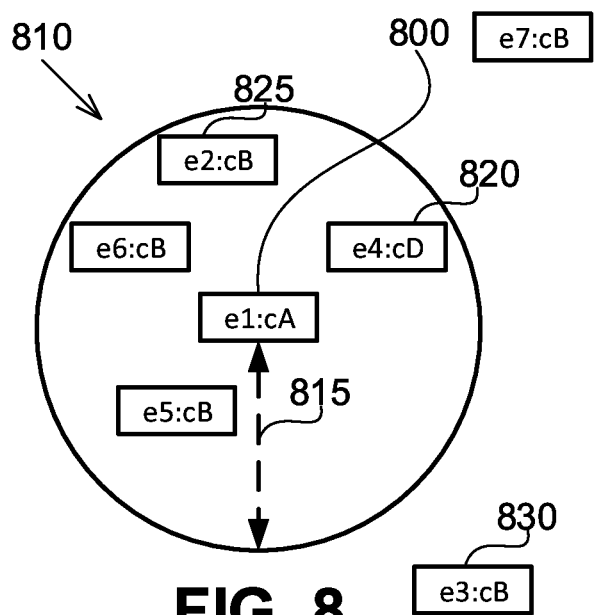
FIG. 8 shows a schematic illustration of an expression-based interest query, in accordance with some exemplary embodiments of the disclosed subject matter.

Reference is now made to FIG. 8, showing a schematic illustration of an expression-based interest query, in accordance with some exemplary embodiments of the disclosed subject matter.

The diagram shows an (x,y) location of each component. Component A of Entity 1 (800) may be assigned to server S. Component 800 may define its expression-based interest as follows: "return type: component of type B, selection: entities within M meters of entity 1." In this case, central database-side platform may process a query fetching entities that meet the selection criteria and return a list of their attached components B. Those components' values may be sent to server S. In the illustrated example, a Radius 815 of M meters defines Area 810. The entities within Area 810 include entities 1, 2, 4, 5 and 6. As the selection is of components of type B, any components B found within these entities would be sent to S, namely those within 2, 5, 6. So, the value of Component 825 will be sent whereas that of Component 820 would not be sent. Additionally, or alternatively, the value of Component 830 may not be sent although it does comprise component of type B, as the entity is located outside of Area 810.

In some exemplary embodiments, entities may be moving in and out of Area 810. As a result, the components returned by this expression-based query may change every time the query is executed. Entities 3 and 7, for example may move into Area 810, while other entities may leave Area 810. In some exemplary embodiments, a central database-side processing may be able to update the inverse interest lists for those components returned in the query (e.g., initially those of 2, 5, 6) and transmit update frequency requirements to them.

In some exemplary embodiments, expression-based interest queries may demand up-to-date values of the component types used in expressions. In the example above, position component values need to be up-to-date to ensure that the correct Component B values are selected for delivery to server S. If the servers assigned to entity 3 and 7's position components are changing their values in and out of Area 810 but do not report position updates to the central database, their components B may not be correctly transferred to S and their inverse interest lists may not be correctly updated. In some exemplary embodiments, component types whose data values are used in expression-based interest query selection definitions may send component updates to the central database at least at a maximal update frequency of all queries that use them. In the example above, if the expression-based query included an update frequency request of f, all position components in all entities, 1-7, would need to have update frequencies requirements that are equal to or greater than f.

It may seem that the global effect of including component types in expression-based interest queries would adversely affect the utility of the disclosed subject matter. In practice, however, it is believed that the vast majority of distributed simulation systems limit expression-based interest to relate to a very small number of components types. As an example, a distributed simulation system may only allow to use expressions relating to position components. In some exemplary embodiments, inverse interest-based bandwidth savings may be disabled for component types used in expression-based interest queries, while still enabled for other component types to provide a significant bandwidth improvement. Additionally, or alternatively, other mechanisms may be leveraged to avoid applying a minimum update frequency globally to all components of a particular type. If a maximum speed is set, for example, the deployment can use that information to set a minimum update frequency only on position components that can possibly enter an expression-based interest query's region of interest within a single update period. More generally speaking, we may allow definition of a maximum derivative magnitude for each component type's data values. In some exemplary embodiments, minimum update frequencies may be set for component types used in expression-based interest only for those components where data values are within "'one query update period'×'maximum data value derivative'" of the range of interest for that data value. Data value binning procedures can be used to limit the number of components involved in this type of search and make the process of identifying relevant components more efficient.

In some exemplary embodiments, it is noted that expression-based queries may include conditions relating to static information regarding entities without addressing their dynamic values. As an example, if the expression is only checking whether a component type exists on a particular entity and not what its data values are, it does not affect the required update frequency of data updates for components of that type.

Figure 6D:
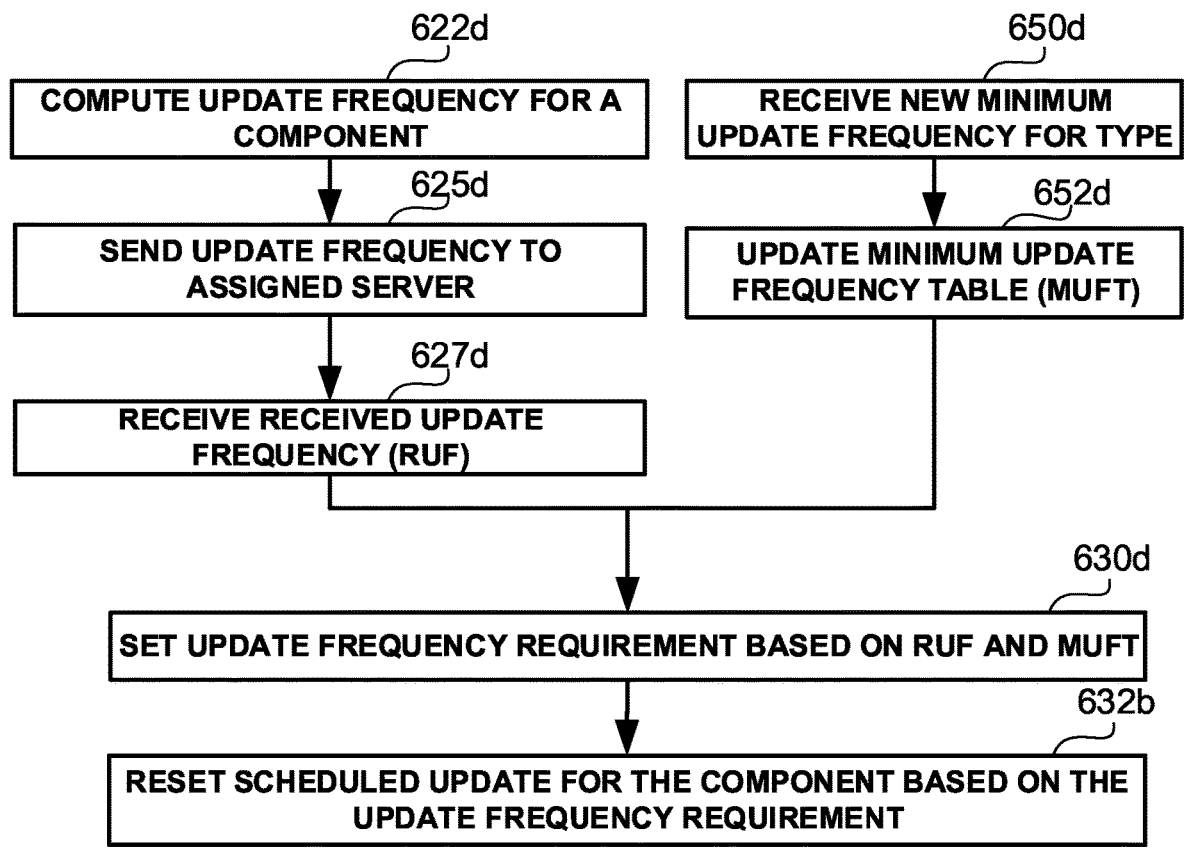
FIG. 6D illustrates a flowchart diagram of a method, in accordance with some exemplary embodiments of the disclosed subject matter.

In some exemplary embodiments, to support expression-based interest queries, Servers may retain a Minimum Update Frequency Table (MUFT). The MUFT may be a table indexed by component type and including the minimum update frequency allowed for each component type. The information may be sent to the server from the central database or another central entity. The new minimum update frequency for a component type may be received by the server (Step 650d of FIG. 6D). The local MUFT may be updated accordingly (Step 652d). It is noted that in some cases, the central database may transmit new minimum updater frequencies for a specific type only for servers that are authoritative over at least one component of the specific type. In some exemplary embodiments, a full MUFT may be retained in the central database and partial projections thereof may be retained in the servers, each projection consisting of types that the server is authoritative over. Additionally, or alternatively, complete copies of the MUFT may be retained locally irrespective of the component types over which the retaining server is authoritative.

Additionally, or alternatively, each component may store a Received Update Frequency (RUF) value (Step 627d). The RUF may be the update frequency that a component would have had based entirely on inverse interest calculations. The update frequency may be computed on the central database (Step 622d) and transmitted to the server (Step 625d), where it is received (Step 627d). The RUF may indicate the update frequency if there would be no update frequency restrictions for the relevant component type in the MUFT. On Step 630d, the update frequency requirement may be computed. The update frequency requirement may be computed based on the RUF and the MUFT. In some exemplary embodiments, the update frequency requirement may be different from RUF if the MUFT defines a higher frequency for the relevant component type than that defined by the RUF. In such a case, the update frequency requirement may be that defined in the MUFT for the relevant component type. Additionally, or alternatively, if the minimal value for the relevant type in the MUFT is below the value of the RUF, the update frequency requirement may be set to be the RUF. On Step 632b, scheduled update for the component, if previously set, may be re-set in view of the new update frequency requirement.

In some exemplary embodiments, instead of performing the determination of the update frequency requirement on the server-side, the comparison between the RUF and the MUFT may be performed on the central database-side, and the final value may be sent to the server to be used (e.g., similar to the flowchart of FIG. 6C. In that case, however, relatively high bandwidth utilization may be caused in certain cases. For example, a modification of the minimum update frequency of a particular type, may induce modifications of many update frequency requirements of specific components. Each such modified update frequency requirement would be transmitted from the central database to the server, potentially modifying the value for many different components in the same server. If the final processing is performed on the server-side, only the new minimum update frequency value itself is sent to the server, and the server itself handles the ramifications on the different components over which it has authority. Hence, there is only a limited additional processing in the server in lieu of potentially substantive bandwidth utilizations.

In some exemplary embodiments, central database-side code may be utilized to calculate the MUF for component types. In some exemplary embodiments, in response to an expression-based interest query being added, changed or removed, a central database-side subroutine may be invoked to track component types with data used in the expression as well as the query frequency. For each component type (T) in the expression, the query frequency (f) is noted, e.g., denoted as the pair (T, f). If T was previously set to be at MUF of f, then no modification is required. Otherwise, the MUFT may be updated to indicate the new minimal update frequency of f. It is noted that if several expressions exist in different queries, the frequency f may be the maximal of the frequencies of the queries that involve the type T. In some exemplary embodiments, if after the modification a type T is no longer included in any of the expressions, the type may be removed from the MUFT. Additionally, or alternatively, if after the modification a type T that was previously included in a query is no longer included in that query (e.g., because the expression was modified, because the query was removed), the frequency value off is determined for T in view of the remaining queries that involve T (e.g., potentially reducing the MUF value if the expression in the query with the highest frequency no longer involves T). In some exemplary embodiments, if a value in the MUFT with respect to components of type T is updated as a result of the processing performed, the update frequency requirement of components of type T may be re-calculated. In some exemplary embodiments, the re-calculations may be performed on the central database side, and any update may be transmitted to the server that is authoritative over the relevant component for implementation. Additionally, or alternatively, the update in the MUFT may be broadcasted to relevant servers (e.g., servers that are authoritative over components of type T). The servers may re-compute the update frequency requirement for the components they are authoritative over using the updated value in the MUFT.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer readable medium retaining program instructions for implementing a method in a distributed simulation system for performing a simulation composed of a plurality of components, wherein the distributed simulation system comprising multiple servers and a central database, wherein each server of the multiple servers is tasked with processing a portion of the plurality of components of the simulation, wherein the central database is tasked with storing values of components and delivering the values or portion thereof to one or more servers based on interest definitions, wherein the program instructions are configured, when read, to cause a processor to perform:

processing of a target component by the server, whereby setting a new value to the target component, wherein the target component is comprised by the plurality of components of the simulation, wherein the server is comprised by the multiple servers; and determining, based on interest definitions of other components that are processed by other servers, to avoid providing an immediate update of the new value to the central database, whereby reducing bandwidth utilization between the server and the central database, wherein said determining is based on an inverse interest list, wherein the inverse interest list comprises an identification of components whose values are calculated based on the target component, wherein said determining is further based on a determination whether a value of any of the components in the inverse interest list is computed by another server other than the server, wherein the inverse interest list is pre-calculated, wherein said determination is based on a flag a-priori determined based on the inverse interest list.

2. The non-transitory computer readable medium of claim 1, wherein said determining to avoid providing an immediate update comprises:

determining, based on the interest definitions of the other components that are processed by other servers that computation of value of none of the other components is based on the target component; and determining to avoid providing any update to the central database.

3. The non-transitory computer readable medium of claim 1, wherein said determining to avoid providing an immediate update comprises:

determining an update frequency requirement of the target component, wherein the update frequency is based on an update frequency request of each component that is processed by another server and that computation thereof is based on the target component; and providing an update to the target component after a time elapsed so as to uphold the update frequency requirement, whereby potentially reducing a number of updates of the target components that occur in a higher frequency than the update frequency requirement.

4. The non-transitory computer readable medium of claim 3, wherein said determining the update frequency requirement is performed by the central database, wherein the method further comprises sending the update frequency requirement from the central database to the server.

5. The non-transitory computer readable medium of claim 1, wherein value of the flag is updated in response to a modification of component-server deployment causing a change in an identify of a server responsible for a component of the plurality of components.

6. The non-transitory computer read medium claim 1, wherein the inverse interest list is updated in response to a change in interest definitions.

7. The non-transitory computer readable medium of claim 1, wherein the program instructions are further configured to cause the processor to provide an immediate update of the new value of the target component to the central database in response to a change in the inverse interest list or in component-server deployment affecting the target component.

8. The non-transitory computer readable medium of claim 1, wherein the program instructions are configured, when read, to cause a processor to perform:

determining, based on interest definitions of other components that are processed by other servers, to provide an immediate update of the new value to the central database;

in response to said determining to provide the immediate update of the new value, transmitting from the server to the central database an update command, whereby setting the new value to the target component in the central database, whereby enabling the central database to update at least one other server that is different from the server with the new value of the target component.

9. The non-transitory computer readable medium of claim 1, wherein the program instructions are configured, when read, to cause a processor to perform:

in response to a determination that the target component is a persistent component that is comprised by a snapshot of the simulation, providing an immediate update of the new value to the central database, whereby setting the new value to the target component in the central database.

10. The non-transitory computer readable medium of claim 1, wherein the program instructions are configured, when read, to cause a processor to perform:

setting a periodic update of the target second component, wherein the target component is a persistent component that is comprised by a periodic snapshot of the simulation, wherein the periodic snapshot is taken at a predetermined interval, wherein the periodic update of the target component is determined based on the predetermined interval; and providing an update of the target new value to the central database in accordance with the periodic update.

11. The non-transitory computer readable medium of claim 1, wherein the interest definitions comprise expression-based interest.

12. A distributed simulation system for performing a simulation comprising a plurality of components, the system comprising:

multiple servers and a central database, wherein each server of the multiple servers is tasked with processing a portion of the plurality of components of the simulation, wherein the central database is tasked with storing values of components and delivering the values or portion thereof to one or more servers based on interest definitions, wherein said distributed simulation system is configured to perform:

processing of a target component by a server, whereby setting a new value to the target component, wherein the target component is comprised by the plurality of components of the simulation, wherein the server is comprised by the multiple servers; and determining, based on interest definitions of other components that are processed by other servers, to avoid providing an immediate update of the new value to the central database, whereby reducing bandwidth utilization between the server and the central database, wherein said determining is based on an inverse interest list, wherein the inverse interest list comprises an identification of components whose values are calculated based on the target component, wherein said determining is further based on a determination whether a value of any of the components in the inverse interest list is computed by another server other than the server, wherein the inverse interest list is pre-calculated, wherein said determination is based on a flag a-priori determined based on the inverse interest list.

13. The distributed simulation system of claim 12, wherein said determining to avoid providing, an immediate update comprises:

determining, based on the interest definitions of the other components that are processed by other servers that computation of value of none of the other components is based on the target component; and determining to avoid providing any update to the central database.

14. The distributed simulation system of claim 1, wherein said determining to avoid providing an immediate update comprises:

determining an update frequency requirement of the target component, wherein the update frequency is based on an update frequency request of each component that is processed by another server and that computation thereof is based on the target component; and providing an update to the target component after a time elapsed so as to uphold the update frequency requirement, whereby potentially reducing a number of updates of the target components that occur in a higher frequency than the update frequency requirement.

15. The distributed simulation system of claim 14, wherein said determining the update frequency requirement is performed by the central database.

16. The distributed simulation system of claim 12, wherein value of the flag is updated in response to a modification of component-server deployment causing a change in an identity of a server responsible for a component of the plurality of components.

17. The distributed simulation system of claim 12, wherein the inverse interest list is updated in response to a change in interest definitions.

18. The distributed simulation system of claim 12, wherein the interest definitions comprise expression-based interest.

* * * * *